March 19, 1929.  L. F. BURNHAM ET AL  1,705,713
TRANSMISSION MECHANISM
Filed March 10, 1927    3 Sheets-Sheet 1

WITNESSES:
R. S. Williams
W. D. O'Connor

INVENTORS
Leland F. Burnham, Burton H. Slocum,
And Emil R. Weber
BY
Wesley P. Carr
ATTORNEY

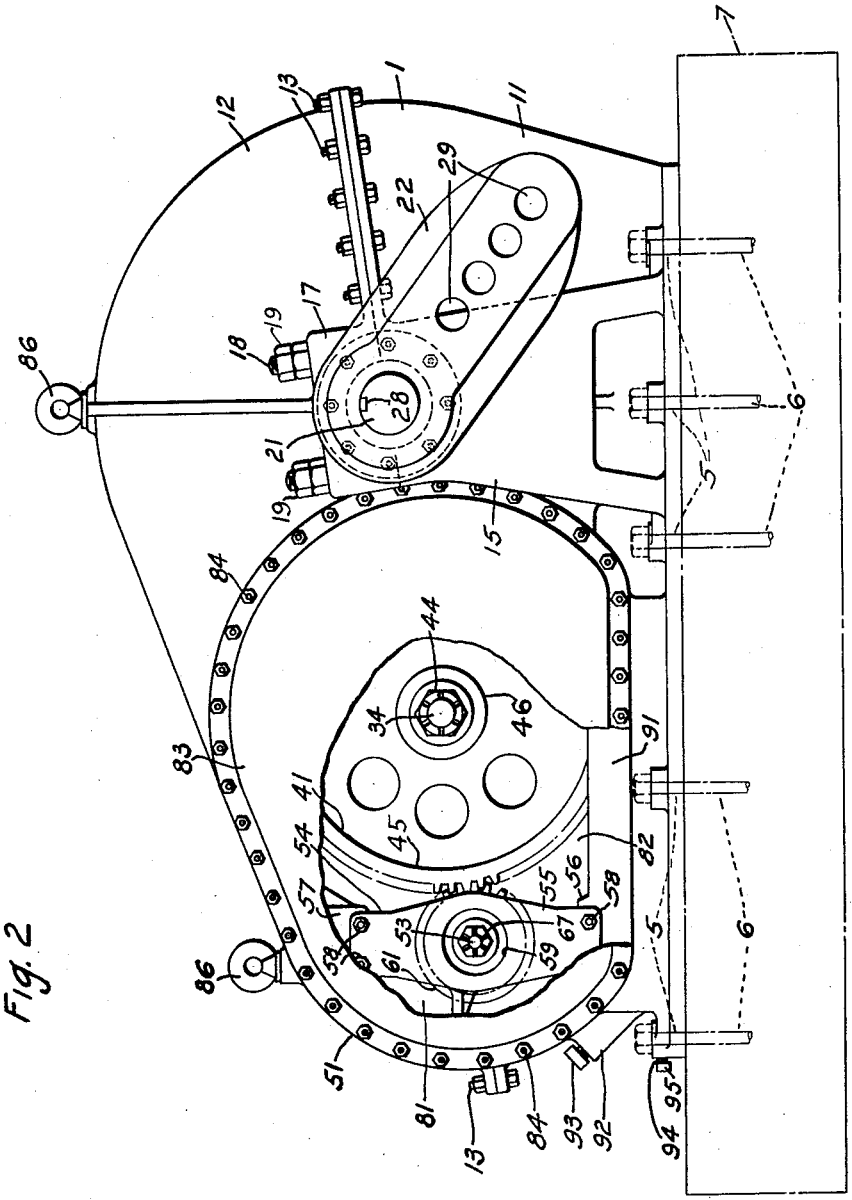

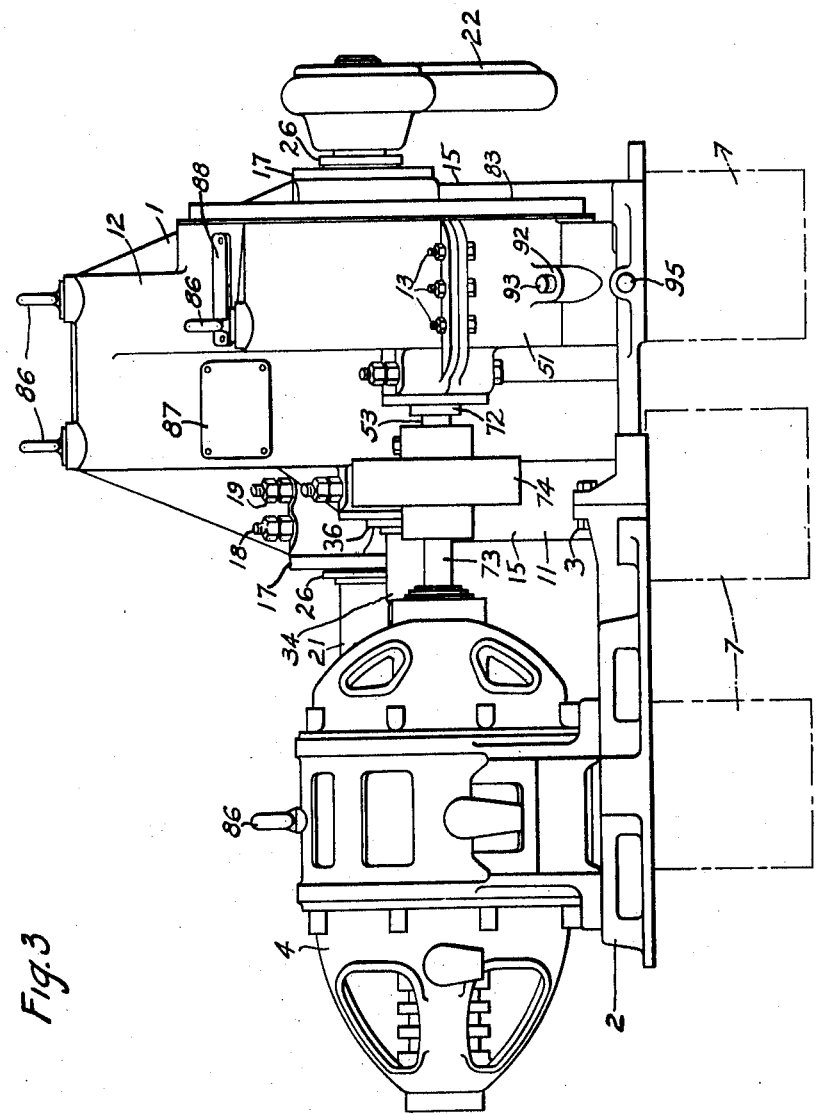

Patented Mar. 19, 1929.

1,705,713

UNITED STATES PATENT OFFICE.

LELAND F. BURNHAM AND BURTON H. SLOCUM, OF PITTSBURGH, AND EMIL R. WEBER, OF AVALON, PENNSYLVANIA, ASSIGNORS, BY MESNE ASSIGNMENTS, TO WESTINGHOUSE ELECTRIC & MANUFACTURING COMPANY, A CORPORATION OF PENNSYLVANIA.

TRANSMISSION MECHANISM.

Application filed March 10, 1927. Serial No. 174,117.

Our invention relates to transmission mechanisms and particularly to gear-reduction units for oil-well-pumping equipments.

An object of our invention is to provide a compact oil-well-pumping unit of rugged construction that shall be of light weight and adapted to be readily moved from one location to another.

Another object of our invention is to provide a gear-reduction unit having means whereby the gear ratio of the unit may be readily changed by removing gear wheels therefrom and substituting others of different diameters.

Another object of our invention is to provide an oil-well-pumping unit having a removable bedplate adapted to support a motor.

Another object of our invention is to provide an oil-well-pumping unit having two sprocket wheels adapted to rotate at different speeds for driving auxiliary apparatus, such as sand reels or hoists.

The varying conditions met in pumping oil wells make it necessary to provide a transmission mechanism between the motor and the oil-well pump that shall be so flexible as to be readily adapted to the various requirements of service.

Oil-well pumps may be operated at speeds of 15 to 35 strokes per minute of approximately 15 inches to 72 inches length. The length of the stroke and the number of strokes per minute must be adjusted by trial for each individual well until the best combination is found. The length of the stroke is ordinarily adjusted by changing the crank throw or effective length of the crank on the crank shaft. The number of strokes per minute is ordinarily adjusted by changing the speed of the motor, or, in the case of belt-driven equipment, by introducing a countershaft between the motor and crank shaft and thereby change the ratio of their respective speeds.

Heretofore, it has been found difficult to make these adjustments with the available equipment. Because the easiest method of changing the speed of the crank shaft was to change the speed of the motor, the motor was either operated at a speed that was too high or too low. Consequently, the equipment operated at a low efficiency during a large portion of the time.

Our invention overcomes these difficulties by providing a gear-reduction unit for transmitting power from the motor to the oil-well pump which is adapted to be readily adjusted to meet the various conditions encountered in pumping wells.

Our transmission unit is so constructed that the ratio of the speed of the motor to the crank shaft may be varied through a wide range by removing a gear wheel and a pinion therefrom and substituting another gear wheel and pinion of different diameters.

Our device is provided with means for securing the bedplate of the motor to the side of the transmission unit. The latter may be adapted for use with any type of motor by providing a suitable bedplate therefor.

Furthermore, our transmission mechanism is provided with sprocket wheels for operating the various auxiliary apparatus used for cleaning wells, pulling casings and the like, and may be adjusted conveniently to operate this apparatus at the proper speed.

The mode of operation and the superior construction of our oil-well pumping unit may be more readily appreciated by referring to the drawings, wherein:

Fig. 2 is a view, in side elevation, of our transmission mechanism, the cover plate being partially broken away, and Fig. 3 is a view, in end elevation, of the transmission mechanism of Figs. 1 and 2.

Figure 1:
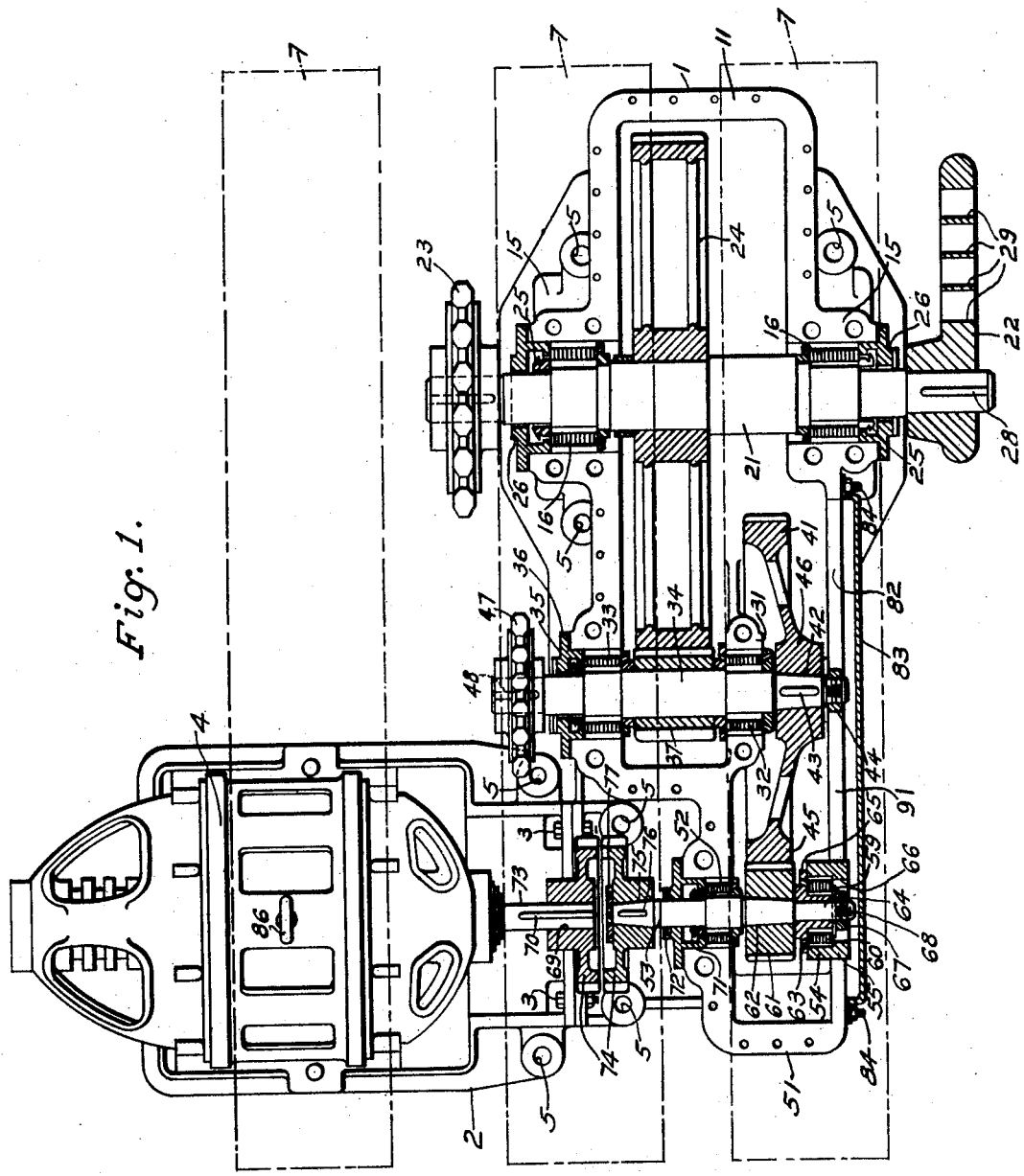
Figure 1 is a plan view, partially in section, of a transmission mechanism, embodying our invention, the upper housing member being removed.

Referring to the drawings, the transmission mechanism embodying our invention comprises a housing 1, having a bedplate 2 secured to the side thereof by means of bolts 3 for supporting a motor, such as an electric motor 4. Bolt holes 5 are provided in the housing 1 and the bedplate 2 for receiving bolts 6 that are adapted to secure the transmission mechanism to a foundation 7.

The housing 1 comprises a lower housing member 11 and an upper housing member 12 that is mounted thereon and securely joined thereto by a plurality of bolts 13. The lower housing member 11 is provided on one end, with integral bearing pedestals, 15 placed at the respective sides thereof, for supporting anti-friction bearings 16. The bearings 16 are secured to the pedestals 15 by means of bearing caps 17 that are integral parts of the upper housing member 12 and are retained in position by studs 18 and lock nuts 19. A crank shaft 21 is journalled in the bearings 16 in such manner that its ends protrude therefrom and provide mounting means for a crank arm 22 and a sprocket wheel 23. A gear wheel 24 is securely fastened to the shaft 21 between the bearings 16. An oil thrower 25 on the shaft 21 is provided at the outside end of each bearing 16 and a dust cap 26 on the outside of each bearing pedestal 15 is provided for preventing leakage of oil from the bearings 16 and to exclude foreign materials therefrom.

The crank arm 22, that is secured to the end of the shaft 21 by means of a press fit and a key 28, is provided with a plurality of holes 29 that are disposed at different radial distances from the center of the shaft 21 to receive a crank pin (not shown) for operating a well pump.

A bearing pedestal 31 is provided in substantially the center of the casing member 11 for supporting an anti-friction bearing 32 that is retained in position by a bearing cap (not shown) in axial alinement with a bearing 33 in the side wall of the housing member 1. A countershaft 34, that is journalled in the bearings 32 and 33 in such manner that one end protrudes from the bearing 33, is provided with an oil thrower 35 and an encircling dust collar 36 that are adapted to prevent leakage of oil from the bearing 33. A pinion 37 is mounted on the shaft 34 between the bearings 32 and 33 for cooperatively engaging the gear wheel 24 on the shaft 21.

A gear wheel 41 is removably secured to the end of the shaft 34, outside of the bearing 32, by means of a tapered fit 42, a key 43, and a nut 44. The rim 45 of the gear wheel 41 is dished or offset from the hub 46 in such manner that the edge of the rim lies in a transverse plane passing approximately through the center of the bearing 32. The gear wheel 41 is dished in the manner described in order to minimize the bending stresses at that end of the shaft 34 upon which gear wheel 41 is mounted. The other end of the shaft 34, which extends outside of the housing 1, is provided with a sprocket wheel 47 that is secured thereto by a press fit and a key 48.

An end portion 51 of the housing 1 is narrowed to approximately one-half the width of the main portion of the housing. A bearing member 52 in the side wall of the restricted portion 51 of the housing is provided for journalling one end of a driving shaft 53 in parallelism with the counter shaft 34. The other end of the driving shaft 53 is journalled in a removable bearing bracket 54.

The bearing bracket 54 comprises an elongated supporting member 55 that is secured to lugs 56 and 57 in the lower housing member 11 and the upper housing member 12, respectively, by means of cap screws 58. The supporting member 55 is provided with a central cylindrical opening 59 that is adapted to receive an anti-friction bearing 60. A pinion 61 is removably mounted on the shaft 53, between the bearings 52 and 60, by means of a tapered fit 62 in such a position that it cooperatively engages the removable gear wheel 41 on the counter-shaft 34. A collar or journal member 63 is mounted on a cylindrical end portion 64 of the shaft 53, and serves as a journal for the bearing 60.

The outer raceway of the bearing 60 is retained in position by a shoulder 65 on the collar 63 on one side, and by a shoulder on the supporting member 55 on the other side. The roller assembly and inner raceway of the bearing 60 are retained in position by a washer 66 and the collar 63. The pinion 61, collar 63, roller assembly and inner raceway of the bearing 60 and the washer 66, are all retained in position by means of a nut 67 that engages a threaded portion 68 of the shaft end 64.

The other end of the shaft 53 is provided with the usual oil-thrower 71 and dust cap 72 for preventing the leakage of oil from the housing 1. A flexible coupling member 74 is secured to the end of the shaft 53 by means of a tapered fit 75, a key 76 and a nut 77. The flexible coupling 74 is also secured to the armature shaft 73 of the motor 4 by means of a press fit 69 and a key 70.

The upper housing member 12 has a relatively large opening 81 in the side thereof which is in alinement with a complementary opening 82 in the lower housing member 11. The openings 81 and 82 are covered by means of a single cover plate 83 that is secured to the upper and lower housing members by a plurality of bolts 84. The upper housing member 12 is further provided with eyebolts 86 to facilitate removal thereof, and with hand-hole covers 87 and 88 which may be removed to uncover openings through which the interior of the housing 1 may be inspected.

The lower housing member 11 is provided with an oil dam 91 at the bottom of the opening 82, the purpose of which, is to retain lubricant within the lower portion of the housing 1 when the cover plate 83 is removed. A filling opening 92, having a cap 93, is provided in the end 51 of the housing member 11 for the purpose of introducing a lubricant, such as oil, and a drain pipe 94 having a cap 95 is provided in the lower portion of the housing member 11 in order that the oil may be readily removed therefrom.

If, at any time, it is found to be desirable to change the ratio between the speeds of the driving shaft 53 and the crank shaft 21 of our transmission unit, the change may be readily made by removing the gear wheel 41 and the pinion 61, and substituting another gear wheel of the appropriate diameter to effect the required speed ratio, and a cooperating pinion member. The change is made by first removing the bolts 84 and the cover plate 83, whereupon the removable bearing bracket 54 may be detached from the lugs 56 and 57 by unscrewing the cap screws 58 and may be removed from the housing with the outer raceway of the bearing 60 by sliding them off the race assembly of the bearing 60. The nut 67 on the end of the shaft 53 is next unscrewed, and the washer 66, the inner raceway and roller assembly of the bearing 60 and the collar 63 are removed from the shaft end 64. The pinion member 61 may then be pulled from the shaft 53 by means of the usual pinion puller or a similar tool.

Similarly, the gear wheel 41 is removed by, first, unscrewing the nut 44 and then pulling the gear wheel from the end of the shaft 34. The gear wheel and pinion to be substituted are simply placed in their proper positions on the ends of the shafts 34 and 53. The collar 63, the roller assembly and inner raceway of the bearing 60 and the washer 66, are placed on the end 64 of the shaft 53. The nuts 44 and 67 are then screwed upon the ends of the shafts 34 and 53, respectively, and turned up tightly in order to retain the gear wheel 41 and the pinion 61 rigidly in their proper operating positions. The removable bearing bracket 54 and the outer raceway are then slipped over the roller assembly of the bearing 60 and bolted in place by means of the cap screws 58.

The length of the pumping stroke may be readily adjusted by reason of the plurality of crank-pin-holes 29 in the crank arm 22. If our transmission mechanism is to be used, at any time, in a locality where electric power for the motor 4 were not conveniently available, a type of prime mover, such as a multiple-cylinder gasoline engine, (not shown) may be used by removing the bed plate 2 and substituting one that is suitable for the prime mover to be used.

When our transmission unit is in operation, auxiliary equipment may be driven by means of chains (not shown) from the sprocket wheel 23 or from the sprocket wheel 47, depending upon the speed required.

From the foregoing description of our invention, it is evident that a transmission mechanism for oil-well-pumping operations made in accordance therewith provides a compact and rugged unit that may be adapted to operate with any type of motor and may be readily adjusted to provide whatever length or frequency of pumping stroke may be advisable for a given condition.

Although we have described a specific embodiment of our invention, it will be obvious to those skilled in the art that various changes and modifications may be made in the details of the device and in the arrangement of the various parts without departing from the spirit and scope of our invention as defined in the appended claims.

We claim as our invention:

1. An oil-well-pumping transmission mechanism comprising a lower housing member, an upper housing member mounted thereon, said housing members having adjacent openings in one side thereof, a plurality of shafts journaled in said housing members with their ends adjacent said openings, gear-wheels removably mounted on said shafts and adapted to be removed from said housing members through the openings and a cover member for said openings.

2. In an oil-well-pumping transmission mechanism, a housing having an opening in one side thereof, aligned bearings in each side of said housing, a driven shaft journaled in said bearings, a plurality of bearings in the side of the housing opposite the opening, a bearing pedestal within the housing, a bearing in said pedestal in alignment with one of said bearings in the housing, a bearing bracket removably mounted in said opening, a bearing in said bracket in alignment with another of said bearings in the housing, shafts journaled in said aligned bearings and gear-wheels removably mounted on said shafts, said gear wheels being removable through said opening.

3. An oil-well-pumping transmission mechanism comprising a housing, a crankshaft journaled in said housing with its ends protruding therefrom, a gear wheel mounted on said crank shaft within the housing, a counter shaft journaled in said housing with one end protruding therefrom, a pinion on said counter-shaft for engaging the gear wheel on the crank shaft, a gear wheel removably mounted on the end of said counter shaft within the housing, a removable bearing bracket within the housing, a driving shaft journaled in said bearing bracket and a pinion removably mounted on said driving shaft for engaging the gear wheel on the counter shaft.

4. In an oil-well-pumping transmission mechanism, a housing having an opening in one side thereof, a bearing pedestal within said housing, a bearing in the side of the housing opposite said opening, a shaft journaled in said bearings, a gear wheel removably mounted on the end of said shaft next to the opening, a second bearing in the side of the housing, a removable bearing bracket adjacent said opening and a drive shaft journaled in said bearings and having a pinion removably mounted between said bearings for engaging said gear wheel, the gear wheel, bearing bracket and pinion being removable through said opening in the housing and a cover member for said opening.

5. An oil-well-pumping transmission mechanism comprising a housing, bearings in opposite sides of said housing, a driven shaft journaled in said bearings, a gear wheel mounted on the driven shaft within the housing, a counter shaft mounted parallel to said driven shaft, a bearing in one side of said housing and a bearing pedestal within said housing for journaling said counter shaft, a pinion mounted on said counter shaft between said bearings for engagement with the gear wheel on the driven shaft, a gear wheel removably mounted on the end of said counter shaft within the housing, a driving shaft mounted parallel to said counter shaft, a bearing in one side of said housing and a removable bearing bracket within said housing for journaling said driving shaft, and a pinion removably mounted on said driving shaft between the bearings for engagement with the gear wheel on the counter shaft.

6. In an oil-well-pumping system, the combination with an electric motor, of a transmission mechanism and a bed plate for said motor removably secured thereto, said transmission mechanism comprising a casing having an opening in one portion thereof, a bearing pedestal and a removable bearing bracket within the casing, and a gear train therein, some of the gear wheels of said gear train being supported by the bearing pedestal and the bearing bracket and being removable through said opening without disassembling said casing.

7. A transmission mechanism comprising a housing having an opening in one side, a driven shaft journaled in the housing, a plurality of bearings in the side of the housing opposite the opening, a bearing pedestal within the housing in alignment with one of the bearings in the side of the housing, a bearing bracket removably mounted in the opening in alignment with another bearing in the housing, shafts journalled in the bearings and bracket, and gear-wheels removably mounted on the shafts, said gear wheels being removable through the opening.

In testimony whereof, we have hereunto subscribed our names this 3rd day of March, 1927.

LELAND F. BURNHAM.
BURTON H. SLOCUM.
EMIL R. WEBER.